(12) United States Patent
Yang et al.

(10) Patent No.: US 10,324,937 B2
(45) Date of Patent: Jun. 18, 2019

(54) USING COMBINED COEFFICIENTS FOR VIRAL ACTION OPTIMIZATION IN AN ON-LINE SOCIAL NETWORK

(71) Applicant: Microsoft Technology Licensing, LLC, Redmond, WA (US)

(72) Inventors: Jaewon Yang, Sunnyvale, CA (US); Liang Tang, Sunnyvale, CA (US); Bee-Chung Chen, San Jose, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 258 days.

(21) Appl. No.: 15/221,195

(22) Filed: Jul. 27, 2016

(65) Prior Publication Data

US 2017/0228375 A1     Aug. 10, 2017

Related U.S. Application Data

(60) Provisional application No. 62/293,733, filed on Feb. 10, 2016.

(51) Int. Cl.
*G06N 7/00*    (2006.01)
*G06F 17/21*    (2006.01)
(Continued)

(52) U.S. Cl.
CPC ...... *G06F 16/24578* (2019.01); *G06F 16/248* (2019.01); *G06F 16/9535* (2019.01); *G06F 17/212* (2013.01); *G06N 7/005* (2013.01); *H04L 51/14* (2013.01); *H04L 51/16* (2013.01); *H04L 67/02* (2013.01); *H04L 67/26* (2013.01); *H04L 67/306* (2013.01)

(58) Field of Classification Search
CPC .............. G06F 17/3053; G06F 17/212; G06F 17/30867; G06F 17/30554; G06F 16/24578; G06F 16/9535; G06F 16/248; G06N 7/005; H04L 51/16; H04L 67/02; H04L 67/306; H04L 51/14; H04L 67/26
See application file for complete search history.

(56) References Cited

U.S. PATENT DOCUMENTS 9,639,610 B1    5/2017  Jurgens et al.
2002/0002445 A1*  1/2002  Doliov .............. G06F 17/30867
                                                          703/2
(Continued)

OTHER PUBLICATIONS

"U.S. Appl. No. 15/240,852, Non Final Office Action dated Sep. 21, 2017", 15 pgs.

(Continued)

*Primary Examiner* — Albert M Phillips, III
(74) *Attorney, Agent, or Firm* — Schwegman Lundberg & Woessner, P.A.

(57) ABSTRACT

A news feed system provided with an on-line social network system determines that a news feed is to be constructed for a viewer. The news feed system accesses the viewer's profile and other information associated with the viewer, accesses an inventory of activities that have been identified as potentially of interest to the viewer, and calculates relevance score for each item inventory of activities using the combined coefficients methodology. The activities are then arranged for presentation to the viewer via a news feed web page, using respective calculated relevance scores.

17 Claims, 4 Drawing Sheets

(51) Int. Cl.

| | | |
|---|---|---|
| *H04L 12/58* | (2006.01) | |
| *H04L 29/08* | (2006.01) | |
| *G06F 16/248* | (2019.01) | |
| *G06F 16/2457* | (2019.01) | |
| *G06F 16/9535* | (2019.01) | |

(56) References Cited

U.S. PATENT DOCUMENTS

| | | | |
|---|---|---|---|
| 2011/0153598 A1* | 6/2011 | Kamimaeda | G06F 17/30867 707/723 |
| 2014/0156360 A1* | 6/2014 | Shalita | G06Q 50/01 705/14.1 |
| 2014/0272825 A1 | 9/2014 | Chambers | |
| 2015/0186497 A1 | 7/2015 | Patton et al. | |
| 2015/0227625 A1 | 8/2015 | Chang | |
| 2015/0356576 A1 | 12/2015 | Malaviya et al. | |
| 2016/0103916 A1 | 4/2016 | Even-zohar et al. | |
| 2016/0350802 A1* | 12/2016 | Mehanian | G06Q 30/0254 |
| 2017/0171139 A1* | 6/2017 | Marra | H04L 51/32 |
| 2017/0228349 A1 | 8/2017 | Yang et al. | |

OTHER PUBLICATIONS

Carter, "More Is Always Better: The Power of Simple Ensembles", [Online]. Retrieved from the Internet: <URL: http://www.overkillanalytics.net/more-is-always-better-the-power-of-simple-ensembles/>, (Oct. 8, 2012), 1-14.

Abel, F., et al., "Analyzing user modeling on twitter for personalized news recommendations,", UMAP, (2011), 1-12.

Agarwal, D., et al., "Activity ranking in linkedin feed.", KDD / ACM, (2014), 1603-1612.

Agarwal, D., et al., "Personalizing LinkedIn Feed", KDD'15; ACM, (2015), 1651-1660.

Berkovsky, S., et al., "Personalized Network Updates: Increasing Social Interactions and Contributions in Social Networks", Springer; UMAP, (2012), 1-13.

Berkovsky, S., et al., "Selecting items of relevance in social network feeds.", UMAP, (2011), 329-334.

Bourke, Steven, et al., "Ranking in Information Streams", IUI'13 Companion, Mar. 19-22, 2013, (2013), 99-100.

Boyd, Stephen, et al., "Distributed Optimization and Statistical Learning via the Alternating Direction Method of Multipliers", Foundations and Trends in Machine Learning; vol. 3; No. 1, (2010), 1-125.

Burgess, Matthew, et al., "Leveraging Noisy Lists for Social Feed Ranking", Association for the Advancement of Artificial Intelligence, (2013), 1-10.

Chen, Jilin, et al., "Short and Tweet: Experiments on Recommending Content from Information Streams", ACM 2010, (2010), 1-10.

Chen, Jilin, et al., "Speak Little and Well: Recommending Conversations in Online Social Streams", CHI 2011 • Session: Twitter Systems, (2011), 1-10.

Chen, Kailong, et al., "Collaborative Personalized Tweet Recommendation", Portland, (Aug. 12-16, 2012), 661-670.

Chu, W., et al., "Personalized recommendation on dynamic content using predictive bilinear models", WWW '09 Proceedings of the 18th International Conference on World Wide Web, (2009), 691-700.

Francisci, G., et al., "From Chatter to Headlines: Harnessing the Real-Time Web for Personalized News Recommendation", WSDM'12, Feb. 8-12, 2012, Seattle, Washingtion, USA, (2012), 1-10.

Freyne, Jill, et al., "Social Networking Feeds: Recommending Items of Interest", RecSys2010, Sep. 26-30, 2010, Barcelona, Spain, (2010), 1-4.

Hong, L., et al., "Co-Factorization Machines: Modeling User Interests and Predicting Individual Decisions in Twitter", WSDM'13, Feb. 4-8, 2013, Rome, Italy., (2013), 1-10.

Hong, L., et al., "Learning to Rank Social Update Streams", SIGIR'12, Aug. 12-16, 2012, Portland, Oregon, USA, (2012), 1-10.

Li, Lihong, et al., "Unbiased Offline Evaluation of Contextual-bandit-based News Article Recommendation Algorithms", WSDM'11, Feb. 9-12, 2011, Hong Kong, China., (2011), 1-10.

Paek, T., et al., "Predicting the Importance of Newsfeed Posts and Social Network Friends", Proceedings of the Twenty-Fourth AAAI Conference on Artificial Intelligence (AAAI-10), (2010), 1-6.

Pan, Ye, et al., "Diffusion-aware Personalized Social Update Recommendation", RecSys'13, Oct. 12-16, 2013, Hong Kong, China, (2013), 1-8.

Soh, Ping-Han, et al., "Recommendation for Online Social Feeds by Exploiting User Response Behavior", WWW 2013 Companion, May 13-17, 2013, Rio de Janeiro, Brazil, (2013), 1-2.

Sumbaly, R., et al., "Serving large-scale batch computed data with project voldemort", Proceedings of the 10th USENIX conference on File and Storage Technologies, FAST 2012, (2012), 1-13.

"Final Office Action Issued in U.S. Appl. No. 15/240,852", dated May 31, 2018, 17 Pages.

\* cited by examiner

USING COMBINED COEFFICIENTS FOR VIRAL ACTION OPTIMIZATION IN AN ON-LINE SOCIAL NETWORK

CROSS-REFERENCE TO RELATED APPLICATIONS

This application claims the benefit of U.S. Provisional Application No. 62/293,733, filed Feb. 10, 2016, entitled "VIRAL ACTION OPTIMIZATION," which is incorporated herein by reference in its entirety.

TECHNICAL FIELD

This application relates to the technical fields of software and/or hardware technology and, in one example embodiment, to system and method for using combined coefficients for viral action optimization in an on-line social network.

BACKGROUND

An on-line social network may be viewed as a platform to connect people in virtual space. An on-line social network may be a web-based platform, such as, e.g., a social networking web site, and may be accessed by a use via a web browser or via a mobile application provided on a mobile phone, a tablet, etc. An on-line social network may be a business-focused social network that is designed specifically for the business community, where registered members establish and document networks of people they know and trust professionally. Each registered member may be represented by a member profile. A member profile may be include one or more web pages, or a structured representation of the member's information in XML (Extensible Markup Language), JSON (JavaScript Object Notation), etc. A member's profile web page of a social networking web site may emphasize employment history and education of the associated member.

A member of on-line social network may be permitted to share information with other members by posting an update that would appear on respective news feed pages of the other members. An update may be an original message, a link to an on-line publication, a re-share of a post by another member, etc. Members that are presented with such an update on their news feed page may choose to indicate that they like the post, may be permitted to contribute a comment, etc.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

A method and system for using combined coefficients for viral action optimization in an on-line social network is described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrase "an on-line social networking application" may be referred to as and used interchangeably with the phrase "an on-line social network" or merely "a social network." It will also be noted that an on-line social network may be any type of an on-line social network, such as, e.g., a professional network, an interest-based network, or any on-line networking system that permits users to join as registered members. For the purposes of this description, registered members of an on-line social network may be referred to as simply members.

Each member of an on-line social network is represented by a member profile (also referred to as a profile of a member or simply a profile). The profile information of a social network member may include personal information such as, e.g., the name of the member, current and previous geographic location of the member, current and previous employment information of the member, information related to education of the member, information about professional accomplishments of the member, publications, patents, etc. The profile of a member may also include information about the member's current and past employment, such as company identifications, professional titles held by the associated member at the respective companies, as well as the member's dates of employment at those companies. Information from the profile of a member is used to form a feature vector of the member. The feature vectors representing respective members are used in the on-line social network system, e.g., to compare member profiles to each other, to compare a member profile to other entities maintained in the on-line social network system (e.g., entities representing companies, educational institutions, job postings, etc.).

As mentioned above, an on-line social networking system may be designed to allow registered members to establish and document networks of people they know and trust professionally. Any two members of a social network may indicate their mutual willingness to be "connected" in the context of the social network, in that they can view each other's profiles, profile recommendations and endorsements for each other and otherwise be in touch via the social network. Members that are connected in this way to a particular member may be referred to as that particular member's connections or as that particular member's network. When a member is connected to another member in the on-line social network system, that member's profile is associated with a link indicative of the connection, and the member receives updates regarding the other member, such as, e.g., posts shared by the other member.

An update, for the purposes of this description, is an information item for presentation to one or more members represented by respective member profiles in the on-line social network system. The updates may be presented as part of the member's so-called news feed. A news feed may be provided to a member on a dedicated web page, e.g., on a home page of the member in the on-line social network. A news feed page is generated for each member by a news feed system provided with the on-line social network system and includes items that has been determined as being potentially of interest to that member. Examples of items in the news feed generated for a member are posts and news with respect to the connections of that member and the entities that the member is following (e.g., companies), job postings that have been determined as relevant to the member, content articles, recommendations to connect to other members (so-called PYMK or "people you may know" type of update), etc. The items in the news feed may be referred to as activities for the purposes of this description.

While interacting with the news feed, a user expresses her interest in the activities in the news feed by taking actions on them. There are different kinds of actions that a user can take. For example, a user can click on an activity to get more details, share the activity, or like the activity, e.g., by clicking on the like button. Different actions have different impact on on-line social network. Sharing an activity, commenting or liking an activity results in a new inventory of updates being generated for the news feeds of the acting user's connections. We therefore refer to "like", "comment", and "share" actions as "viral actions," as they Actions performed by a user with respect to items in their news feed that potentially result in subsequent engagement from the acting user's connections are referred to as vital actions. Sharing an activity, commenting or liking an activity are all examples of viral actions. In contrast, when users click on activities to view more details (e.g., in order to read a news article), such interactions are not shown to other users and are thus referred to as non-viral. The totality of all types of actions are referred to as feed interactions.

In order to help users connect with the most relevant information, items in the feed (activities) are ordered by their relevance score estimated by statistical models referred to as feed personalization models (also referred to as scoring models).

A feed personalization model may be designed to estimate probability of feed interactions for each activity in a user's feed and the news feed system may be configured to order the activities in the user's feed, using the estimated probability as relevance score, in a manner directed to increasing the total number of feed interactions. Another feed personalization model may be designed to estimate probability of viral actions for each activity in a user's feed, and the news feed system may be configured to order the activities in the user's feed, using the estimated probability of a vital action, as relevance score, in a manner directed to increasing the number of viral actions with respect to activities in a user's feed. Optimizing the order of presentation of activities in the feed based on the goal of increasing the total number of feed interactions may produce fewer viral actions as compared to when the order of presentation of activities in the feed is based on the goal of increasing the number of viral actions. Conversely, optimizing the order of presentation of activities in the feed based on the goal of increasing the number of viral actions may produce fewer feed interactions as compared to when the order of presentation of activities in the feed is based on the goal of increasing the total number of feed interactions.

Optimizing the order of presentation of activities in the feed based on the goal of increasing the number of viral actions makes the news feed more conversational for the users of the on-line social network system. A viral action is a stronger expression of a user's intent because the user knows that her viral action will be shown to her connections, whereas a non-viral action will not. Also, viral actions increase the inventory of feed items for other users thereby making their feeds richer and possibly increasing the likelihood of their engagement. It will be noted that viral actions are often more laborious to carry out, as compared to non-viral actions and therefore are more rare. Moreover, some feed items such as connection recommendations do not support viral actions, yet are strongly influential in user engagement. In one embodiment, the news feed system is configured to optimize the order of presentation of activities in the feed based on the goal of increasing the number of viral actions with respect to activities in a user's feed while minimizing the loss in feed interactions with respect to the same inventory of activities.

A member of the on-line social network system for whom a news feed is being generated is referred, for the purposes of this description, a viewer (or a focus viewer to indicate that a particle viewer is a focus of our discussion). The profile representing the focus viewer in the on-line social network system is referred to as a focus profile. For a given viewer and each activity i, the news feed system constructs a feature vector $X_i$ using signals characterizing the viewer and the activity. Examples of such features include the viewer's past interactions with respect to items previously presented to the viewer via a news feed, the freshness of the activity (e.g., how recently the activity has been created), the type of the activity and so on.

Given a certain viewer, candidate activities i and the corresponding feature vector $X_i$, the news feed system determines how to rank activities for presentation to the viewer in their news feed.

In one embodiments, the news feed system uses a single scoring model that computes the score $\sigma(\beta_s, X_i)$ for activity i using one coefficient vector $\beta_s$, where $\sigma$ is the sigmoid function $\sigma(x)=1/(1+\exp(-x))$.

The $\beta_s$ is the weighted sum of $\beta_c$ and $\beta_v$, where $\beta_c$ is a coefficient vector learned via logistic regression using training data collected within the on-line social network system with respect to feed interactions, using a great number of features that characterize users and activities respectively to train a feed personalization model, and $\beta_v$ is a coefficient vector learned via logistic regression using the training data collected within the on-line social network system with respect to viral actions. In one embodiment, the feed interaction data obtained via the on-line social network system is split by time into a training period (e.g., a three week training period), and an evaluation period (e.g., a one week evaluation period that follows the three week training period). Each example in the training data is a historical interaction (or an absence of interaction) of a user with an item that has been presented to the user, e.g., whether or not the user clicked, liked, commented or shared the item. One feed personalization model is trained using a regularized logistic regression to predict whether or not user clicks on an item from the feed inventory. Another feed personalization model is trained to predict whether or not a user performed a viral action on the item.

As stated above, the coefficients $\beta_c$ and $\beta_v$ that are learned with respect to these two feed personalization models are combined to produce a combined coefficient, $\beta_s$ as the weighted sum of $\beta_c$ and $\beta_v$ as shown below.

$$\beta_s = (1-\alpha)\beta_c + \alpha\beta_v,$$

where is $\alpha$ is a pre-specified parameter that determines how much focus is on viral actions versus feed interactions. The parameter $\alpha$ is referred to as a tradeoff parameter. The value of $\alpha$ is selected such that the number of viral actions with respect to activities in a user's feed is increased while minimizing the loss in feed interactions with respect to the same inventory of activities.

The relevance score $p_s(i)$ is determined by applying the sigmoid function to the feature vector $X_i$ and the weighted sum of $\beta_c$ and $\beta_v$, as shown below.

$$p_s(i) = \sigma(\beta_s, X_i) = \sigma((1-\alpha)\beta_c X_i + \alpha\beta_v X_i)$$

In one embodiment, the value of the tradeoff parameter $\alpha$ is selected utilizing replay methodology. Replay is a way of simulating past traffic observed in the on-line social network system using the model for estimating $p_s(i)$, while varying the value of the tradeoff parameter $\alpha$. This methodology entails calculating relevance scores for an inventory of activities while varying a value of the tradeoff parameter and ordering the feed inventory based on the calculated relevance scores. Then, the item in the top position is compared to an item that is presented in the top position to a viewer who is subject to a so-called random session. A random session is a login session in the on-line social network system where a user is presented with a feed that includes randomly chosen activities. If the item placed in the top position resulting from a replay is the same item that is presented in the top position in a random session, then the click and the viral actions with respect to the item during the random session are counted as rewards with respect to the replay.

The value of the tradeoff parameter $\alpha$ that results in approaching or achieving the goal of the most increase in the number of viral actions while minimizing the loss in feed interactions is selected for use with the live traffic in the on-line social network system. The result of the simulations may be represented visually as a tradeoff curve using Cartesian coordinates, where the x axis represents the viral action rate and the y axis represents the overall interaction rate. The desirable value of the tradeoff parameter can be visually discerned by examining the tradeoff curve that is constructed based on the result of the simulations.

In operation, the news feed system provided with an on-line social network system determines that a news feed is to be constructed for a viewer, which may occur, e.g., as the viewer starts a new session with the on-line social network system. The news feed system accesses the viewer's profile and other information associated with the viewer, accesses an inventory of activities that have been identified as potentially of interest to the viewer, and calculates relevance score for each item inventory of activities using the combined coefficients methodology described above. The activities are then arranged for presentation to the viewer via a news feed web page, using respective calculated relevance scores. Example method and system for using combined coefficients for viral action optimization in an on-line social network may be implemented in the context of a network environment 100 illustrated in FIG. 1.

Figure 1:
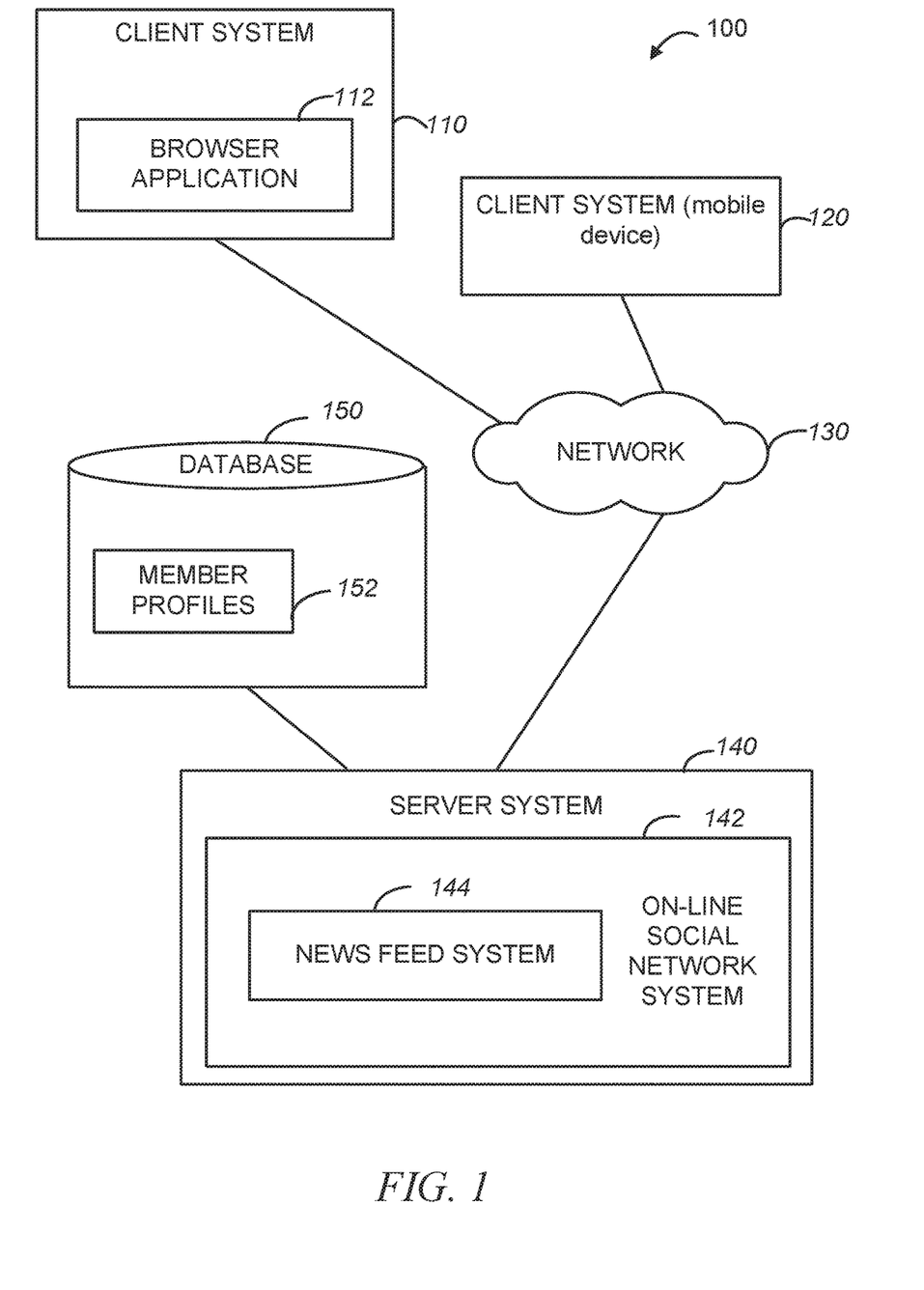
FIG. 1 is a diagrammatic representation of a network environment within which an example method and system for using combined coefficients for viral action optimization in an on-line social network may be implemented.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line social network system 142. As explained above, each member of an on-line social network is represented by a member profile that contains personal and professional information about the member and that may be associated with social links that indicate the member's connection to other member profiles in the on-line social network. Member profiles and related information may be stored in a database 150 as member profiles 152.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a news feed system 144 that may be utilized beneficially to determine respective success scores for higher education institutions referred to as schools for the sake of brevity. The news feed system 144 may be configured to process an inventory of updates for a member of an on-line social network, employing the combined coefficients methodology described above. An example news feed system 144 is illustrated in FIG. 2.

Figure 2:
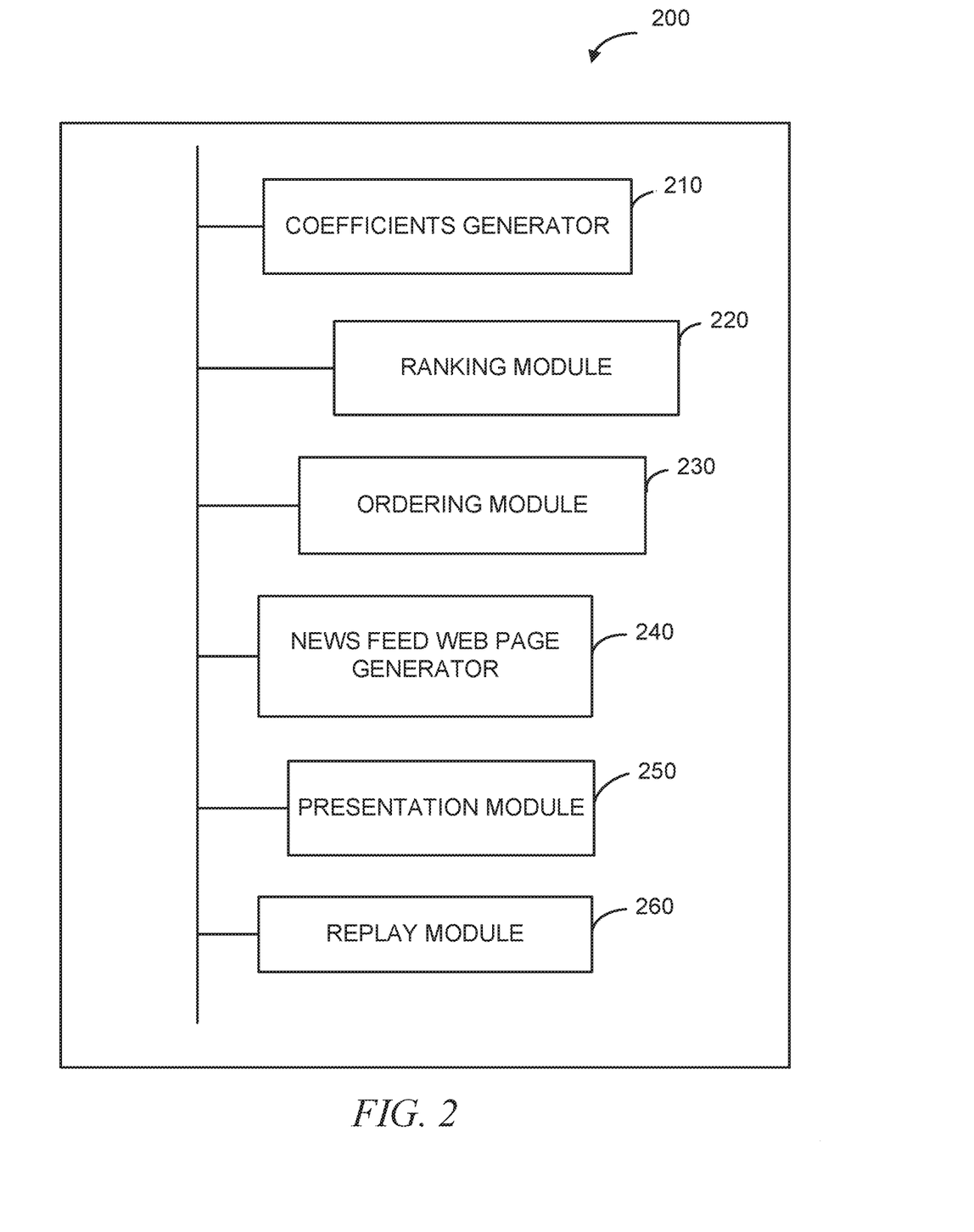
FIG. 2 is block diagram of a system for using combined coefficients for viral action optimization in an on-line social network, in accordance with one example embodiment.

FIG. 2 is a block diagram of a system 200 for using combined coefficients for viral action optimization in an on-line social network, in accordance with one example embodiment. As shown in FIG. 2, the system 200 includes a coefficients generator 210, a ranking module 220, an ordering module 230, a web page generator 240, and a presentation module 250.

The coefficients generator 210 is configured to learn a first logistic regression model to obtain a first coefficient vector with respect to probability of a viewer interaction with an item presented to the viewer via a news feed web page, to learn a second logistic regression to obtain a second coefficient vector with respect to probability of a viewer performing a viral action on an item presented to the viewer via a news feed web page, and calculate a combined coefficient based on the first coefficient vector, the second coefficient vector, and a tradeoff parameter that indicates importance of viral actions as compared to interactions. The coefficients generator 210 learns the first logistic regression model to obtain the first coefficient vector and learns the second logistic regression model to obtain the second coefficient vector using historical data obtained in the on-line social network system 142 of FIG. 1. As explained above, a viral action is an action that results in an additional item being included in an inventory of updates for another member in the on-line social network system 142. An interaction is any action by a viewer with respect to an item presented to the viewer via a news feed web page.

The ranking module 220 is configured to execute a personalization model to obtain a respective relevance rank for each item in an inventory of activities identified as potentially of interest to a focus viewer, using the combined coefficient and respective feature vectors. As explained above, a feature vector is constructed with respect to the focus viewer and a given item from the inventory of activities using signals characterizing the focus member and the given item. The ordering module 230 is configured to order the items in the inventory for presentation to the focus viewer based on the respective relevance ranks of the items in the inventory. In some embodiments, the functionality of the ranking module 220 and the ordering module 230 are performed by a single module. The news feed web page generator 240 is configured to construct a news feed web page that includes items in the inventory ordered based on the respective relevance ranks. The presentation module 250 is configured to cause presentation of the news feed web page on a display device of the focus member.

Also shown in FIG. 2 is a replay module 260. The replay module 260 is configured to determine a value of the tradeoff parameter based on executing simulations, each time varying a value of the tradeoff parameter. As explained above, the executing of simulation comprises utilizing a random session where a user is presented with a feed that includes randomly chosen activities. Some operations performed by the system 200 may be described with reference to FIG. 3.

Figure 3:
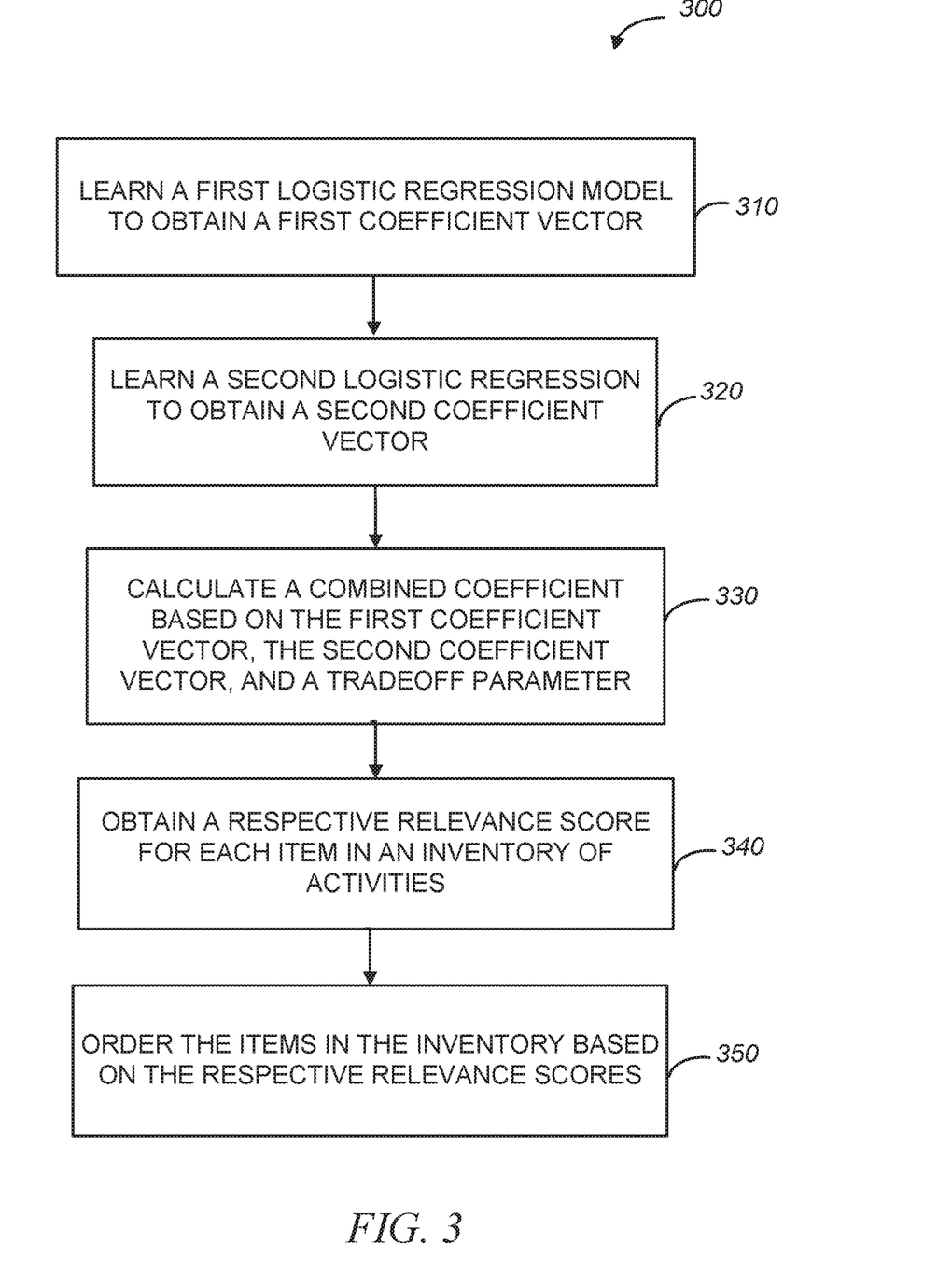
FIG. 3 is a flow chart of a method for using combined coefficients for viral action optimization in an on-line social network, in accordance with an example embodiment.

FIG. 3 is a flow chart of a method 300 for using combined coefficients for viral action optimization in an on-line social network for a member, according to one example embodiment. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, when the coefficients generator 210 of FIG. 2 learns a first logistic regression model to obtain a first coefficient vector with respect to probability of a viewer interaction with an item presented to the viewer via a news feed web page. At operation 320, the coefficients generator 210 learns a second logistic regression to obtain a second coefficient vector with respect to probability of a viewer performing a viral action on an item presented to the viewer via a news feed web page. At operation 330, the coefficients generator 210 calculates a combined coefficient based on the first coefficient vector, the second coefficient vector, and a tradeoff parameter that indicates importance of viral actions as compared to interactions.

At operation 340, the ranking module 220 executes a personalization model to obtain a respective relevance rank for each item in an inventory of activities identified as potentially of interest to a focus viewer, using the combined coefficient and respective feature vectors. The ordering module 230 orders the items in the inventory for presentation to the focus viewer based on the respective relevance ranks of the items in the inventory, at operation 350.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

Figure 4:
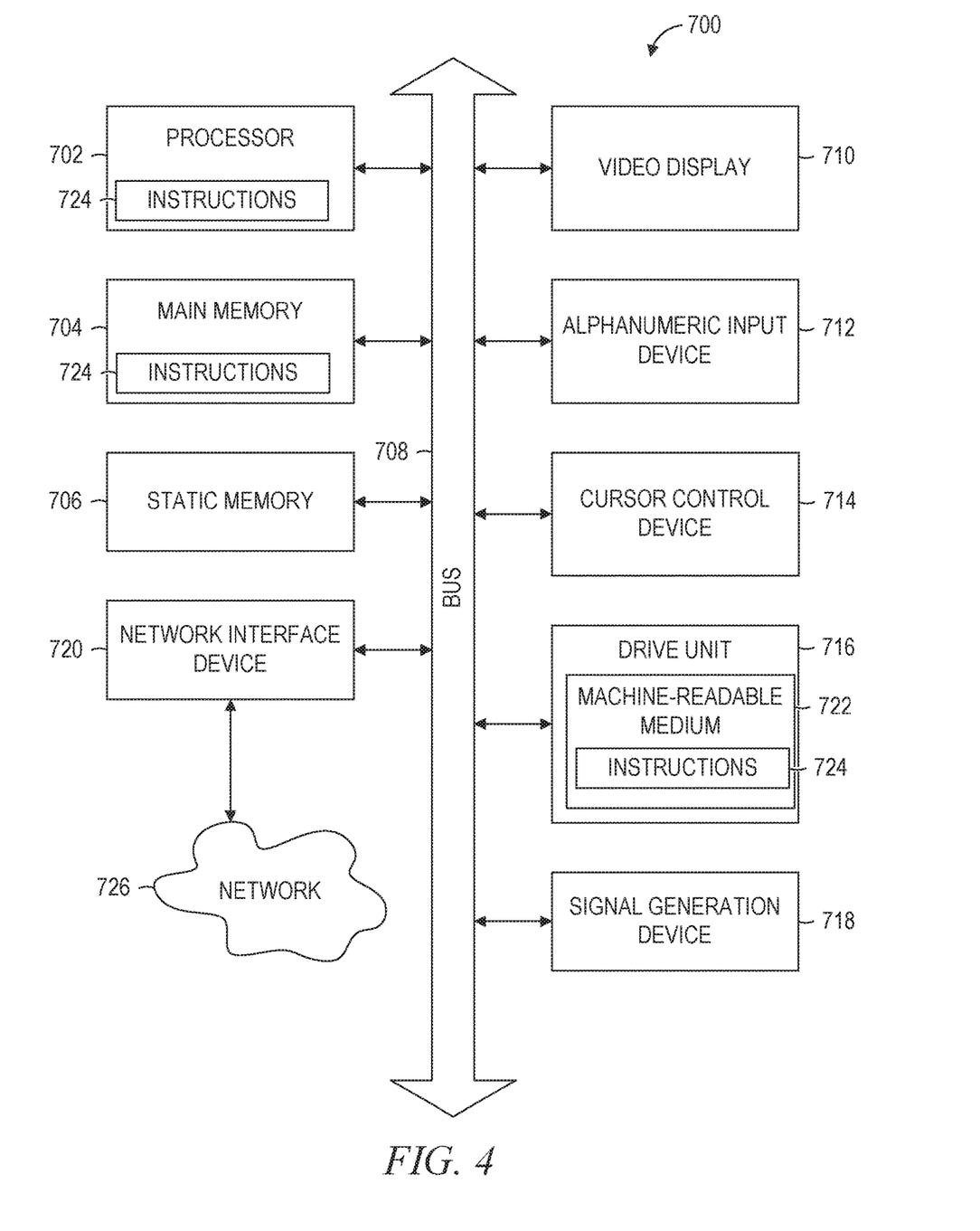
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 700 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor 702 (e.g., a central processing unit (CPU), a graphics processing unit (GPU) or both), a main memory 704 and a static memory 706, which communicate with each other via a bus 707. The computer system 700 may further include a video display unit 710 (e.g., a liquid crystal display (LCD) or a cathode ray tube (CRT)). The computer system 700 also includes an alpha-numeric input device 712 (e.g., a keyboard), a user interface (UI) navigation device 714 (e.g., a cursor control device), a disk drive unit 716, a signal generation device 718 (e.g., a speaker) and a network interface device 720.

The disk drive unit 716 includes a machine-readable medium 722 on which is stored one or more sets of instructions and data structures (e.g., software 724) embodying or utilized by any one or more of the methodologies or functions described herein. The software 724 may also reside, completely or at least partially, within the main memory 704 and/or within the processor 702 during execution thereof by the computer system 700, with the main memory 704 and the processor 702 also constituting machine-readable media.

The software 724 may further be transmitted or received over a network 726 via the network interface device 720 utilizing any one of a number of well-known transfer protocols (e.g., Hyper Text Transfer Protocol (HTTP)).

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, method and system for using combined coefficients for viral action optimization in an on-line social network have been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer-implemented method comprising:
  learning a first logistic regression model to obtain a first coefficient vector, the first coefficient vector being with respect to probability of a viewer interaction with an item presented to the viewer via a news feed web page;
  learning a second logistic regression to obtain a second coefficient vector, the second coefficient vector being with respect to probability of a viewer performing a viral action on an item presented to the viewer via a news feed web page;

executing simulations each time varying a value of a tradeoff parameter that indicates importance of viral actions as compared to interactions;

constructing a tradeoff curve based on the result of the simulations;

selecting a value of the tradeoff parameter to be used in the calculating of the combined coefficient based on information indicated by the tradeoff curve;

calculating a combined coefficient based on the first coefficient vector, the second coefficient vector, and the tradeoff parameter;

using at least one processor, executing a personalization model to obtain a respective relevance rank for each item in an inventory of activities identified as potentially of interest to a focus viewer, using the combined coefficient and respective feature vectors, a feature vector is constructed with respect to the focus viewer and a given item from the inventory of activities using signals characterizing the focus viewer and the given item; and ordering the items in the inventory for presentation to the focus viewer based on the respective relevance ranks of the items in the inventory.

2. The method of claim 1, comprising constructing a news feed web page that includes items in the inventory ordered based on the respective relevance ranks.

3. The method of claim 1, comprising causing presentation of the news feed web page on a display device of the focus viewer.

4. The method of claim 1, wherein the learning of the first logistic regression model to obtain the first coefficient vector is using historical data obtained in the on-line social network system.

5. The method of claim 1, wherein the learning of the second logistic regression model to obtain the second coefficient vector is using historical data obtained in the on-line social network system.

6. The method of claim 1, wherein a viral action is an action that results in an additional item being included in an inventory of updates for another member in the on-line social network system.

7. The method of claim 1, wherein an interaction is any action by a viewer with respect to an item presented to the viewer via a news feed web page.

8. The method of claim 1, wherein the executing of simulation comprises utilizing a random session where a viewer is presented with a feed that includes randomly chosen activities.

9. A computer-implemented system comprising:
one or more processors; and
a non-transitory computer readable storage medium comprising instructions that when executed by the one or processors cause the one or more processors to perform operations comprising:
learning a first logistic regression model to obtain a first coefficient vector, the first coefficient vector being with respect to probability of a viewer interaction with an item presented to the viewer via a news feed web page;
learning a second logistic regression to obtain a second coefficient vector, the second coefficient vector being with respect to probability of a viewer performing a viral action on an item presented to the viewer via a news feed web page;
executing simulations each time varying a value of a tradeoff parameter that indicates importance of viral actions as compared to interactions;
constructing a tradeoff curve based on the result of the simulations;
selecting a value of the tradeoff parameter to be used in the calculating of the combined coefficient based on information indicated by the tradeoff curve; and
calculating a combined coefficient based on the first coefficient vector, the second coefficient vector, and the tradeoff parameter;
executing a personalization model to obtain a respective relevance rank for each item in an inventory of activities identified as potentially of interest to a focus viewer, using the combined coefficient and respective feature vectors, a feature vector is constructed with respect to the focus viewer and a given item from the inventory of activities using signals characterizing the focus viewer and the given item; and
ordering the items in the inventory for presentation to the focus viewer based on the respective relevance ranks of the items in the inventory.

10. The system of claim 9, comprising constructing a news feed web page that includes items in the inventory ordered based on the respective relevance ranks.

11. The system of claim 9, comprising causing presentation of the news feed web page on a display device of the focus viewer.

12. The system of claim 9, wherein the learning of the first logistic regression model to obtain the first coefficient vector is using historical data obtained in the on-line social network system.

13. The system of claim 9, wherein the learning of the second logistic regression model to obtain the second coefficient vector is using historical data obtained in the on-line social network system.

14. The system of claim 9, wherein a viral action is an action that results in an additional item being included in an inventory of updates for another member in the on-line social network system.

15. The system of claim 9, wherein an interaction is any action by a viewer with respect to an item presented to the viewer via a news feed web page.

16. The system of claim 9, wherein the executing of simulation comprises utilizing a random session where a viewer is presented with a feed that includes randomly chosen activities.

17. A machine-readable non-transitory storage medium having instruction data executable by a machine to cause the machine to perform operations comprising:
learning a first logistic regression model to obtain a first coefficient vector, the first coefficient vector being with respect to probability of a viewer interaction with an item presented to the viewer via a news feed web page;
learning a second logistic regression to obtain a second coefficient vector, the second coefficient vector being with respect to probability of a viewer performing a viral action on an item presented to the viewer via a news feed web page;
executing simulations each time varying a value of a tradeoff parameter that indicates importance of viral actions as compared to interactions;
constructing a tradeoff curve based on the result of the simulations;
selecting a value of the tradeoff parameter to be used in the calculating of the combined coefficient based on information indicated by the tradeoff curve;

calculating a combined coefficient based on the first coefficient vector, the second coefficient vector, and the tradeoff parameter;

executing a personalization model to obtain a respective relevance rank for each item in an inventory of activities identified as potentially of interest to a focus viewer, using the combined coefficient and respective feature vectors, a feature vector is constructed with respect to the focus viewer and a given item from the inventory of activities using signals characterizing the focus viewer and the given item; and ordering the items in the inventory for presentation to the focus viewer based on the respective relevance ranks of the items in the inventory.

* * * * *